United States Patent [19]

King et al.

[11] 4,438,682

[45] Mar. 27, 1984

[54] APPARATUS FOR POPPING POPCORN

[75] Inventors: Michael H. King, Scottsburg, Ind.; Lee W. Poppe, Jr.; Oscar A. Wurtenberg, both of Louisville, Ky.

[73] Assignee: National ICEE Corporation, Philadelphia, Pa.

[21] Appl. No.: 447,276

[22] Filed: Dec. 6, 1982

[51] Int. Cl.³ .............................................. A23L 1/18
[52] U.S. Cl. .................................. 99/323.7; 99/323.9
[58] Field of Search ................ 99/323.5, 323.6, 323.7, 99/323.8, 323.9, 468, 483

[56] References Cited

U.S. PATENT DOCUMENTS

| 2,848,937 | 8/1958 | Martin | 99/323.7 |
| 3,294,546 | 12/1966 | Fingerhut | 99/323.7 |
| 4,307,657 | 12/1981 | Avery | 99/323.9 |

Primary Examiner—Robert W. Jenkins
Attorney, Agent, or Firm—Paul & Paul

[57] ABSTRACT

A popcorn popping machine adapted for cyclic operation has a feed conveyor for transporting unpopped corn from the reservoir to the base of the popping tube. A heating chamber has a plurality of heating elements over which air flows on its way through conveying ducts to the popping tube. A manually operable selector switch is adapted to be set at a plurality of positions. This switch controls electric circuitry which controls the operation of the feed conveyor for different preselected segments of a cyclic time period. The number of heating elements which are energized are also controlled by the setting of the selector switch. The selector switch also controls the setting of a damper in the air flow conveying duct.

13 Claims, 11 Drawing Figures

APPARATUS FOR POPPING POPCORN

BACKGROUND OF THE INVENTION

This invention relates to a machine for the preparation of popcorn, and particularly to a popcorn machine for producing popcorn on a volume commercial basis.

In the usual type of commercial popcorn machine, popcorn is fed to the popping jar at a single rate of feed. In such machines, corn will be seen popping in the transparent belljar when the demand is large, but in off-peak hours when the demand is low, the single-rate-of-feed machine will shut down and no corn will be seen popping, since there is sufficient popcorn already popped to take care of the relatively low demand.

SUMMARY OF THE INVENTION

A principal object of the present invention is to provide a commercial popcorn machine in which corn is continuously popped, irrespective of whether the demand is low or high. The sight of corn being popped in the transparent bell jar is a desirable thing. It tells the customer that the corn is being freshly popped. Contrary to the prior art single-rate-of-feed type of popcorn machine, the control for the machine of the present invention is so designed that the operator has a choice of a plural number, preferably four, of different rates of feed at which corn is fed to the popping chamber. When the demand drops off, the operator will manually turn the control switch to a position which will call for a constant but lower rate of feed. Corn will continue to be seen popping in the bell jar, but at a smaller volume. The fact that the volume is smaller will probably not be noticed by the customer. He sees that corn is presently being popped, and that tells him that he will be getting freshly popped corn.

In the machine of the present invention, corn is brought to popping temperature by blowing hot air up through the popping tube. This air is heated by electric rods which project into the duct through which the air is passing. When the popcorn is being fed at a higher rate, a greater number of electric rods are energized than when the rate of feed is lower.

DETAILED DESCRIPTION OF THE PREFERRED EMBODIMENTS

Figure 1:
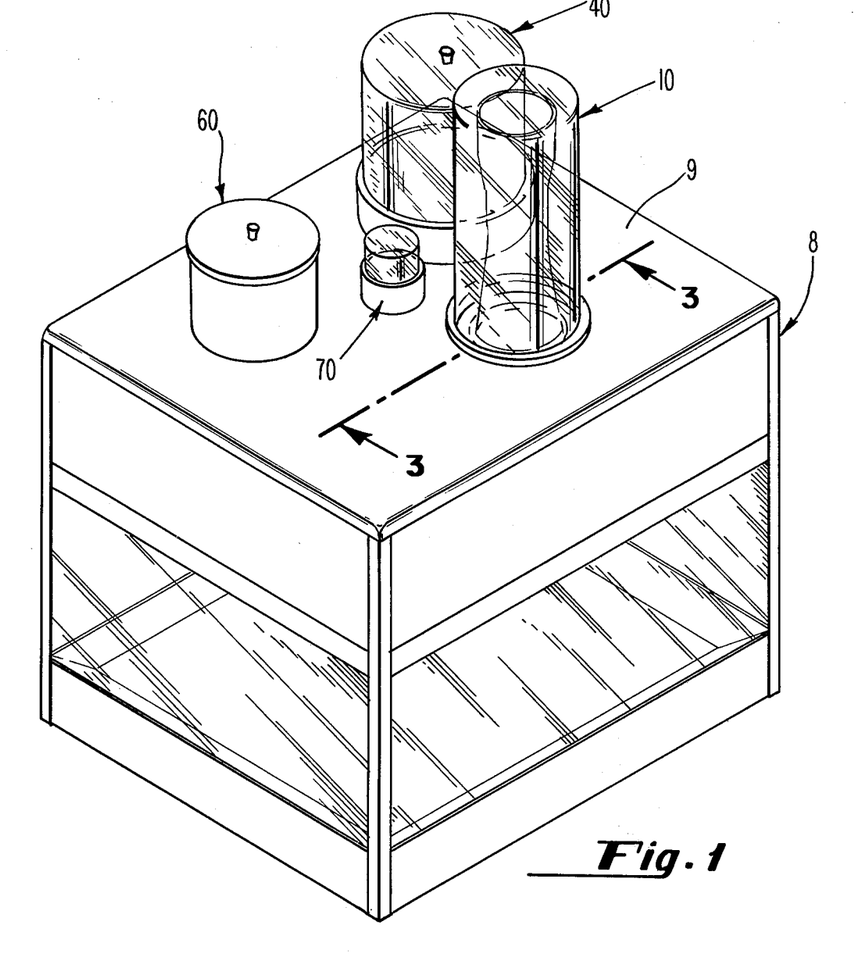
FIG. 1 is a perspective illustration of a corn popping machine according to the present invention.
Figure 2:
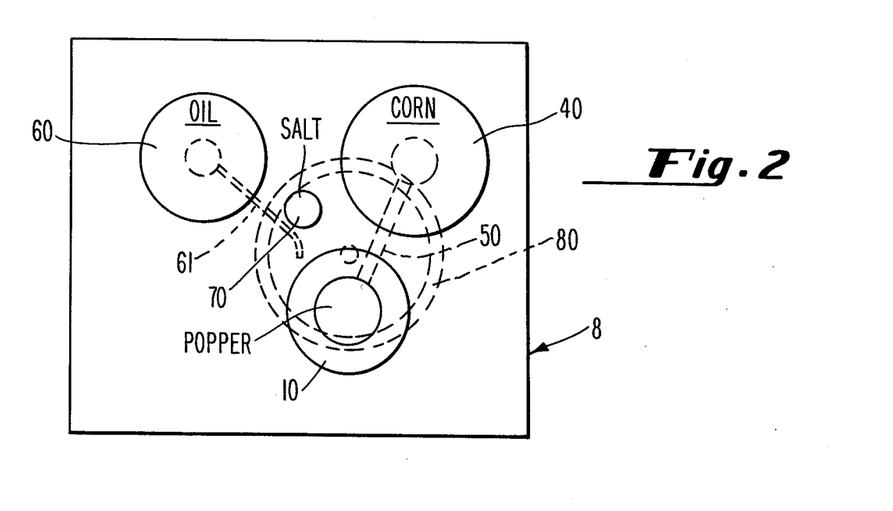
FIG. 2 is a plan view of the machine of FIG. 1.

In FIGS. 1 and 2, there is shown a corn popping machine comprising a rectangular housing or cabinet 8 having a top cover 9. Projecting upwardly from cover 9 are a popping jar 10, a corn reservoir 40, a seasoning oil supply 60, and a salt supply 70. Contained within the popping jar 10 is a popping tube 12 which extends upwardly within the jar 10 to slightly below the dome of the jar. The space between the upper edge of the popping tube 12 and the dome of the jar 10 is sufficient to allow the popped corn to pass over the edge of the tube and down into the jar 10. The jar 10 may, for example, be 17" tall and the popping tube 12 may be 16¼" tall.

Figure 5:
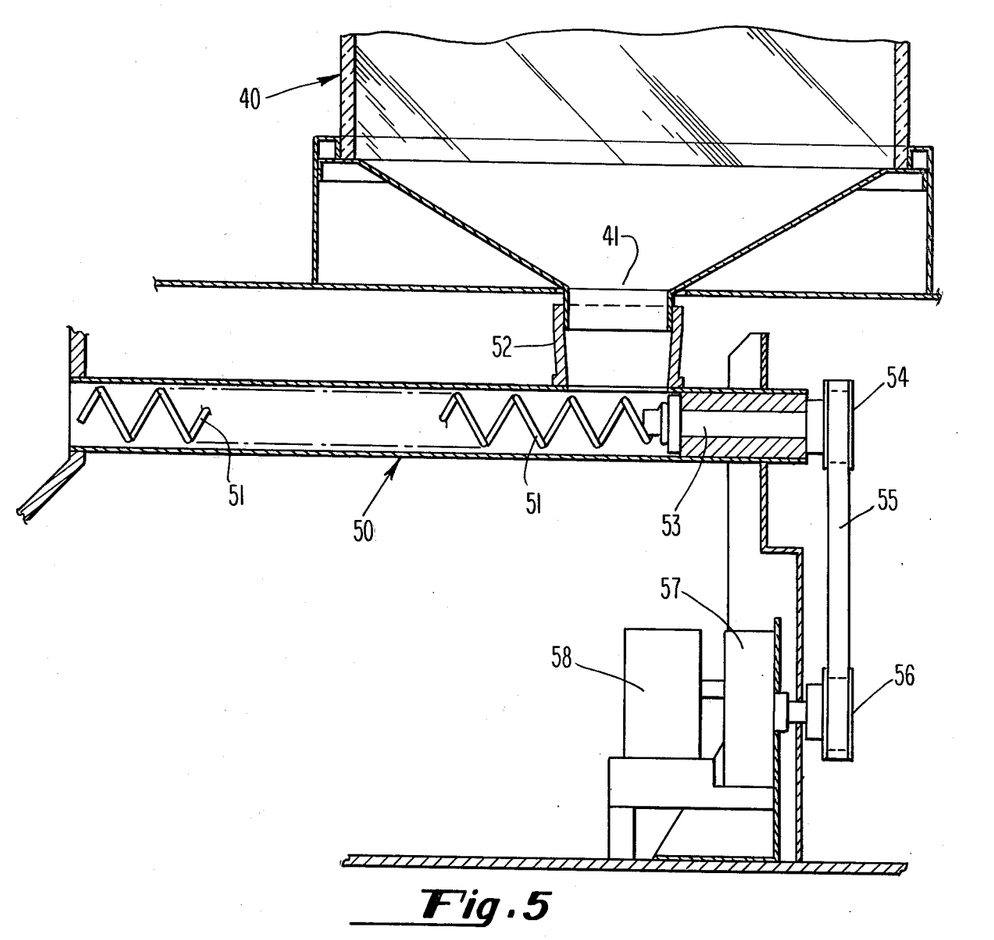
FIG. 5 is an elevational view, in section, looking along the line 5—5 of FIG. 4.
Figure 6:
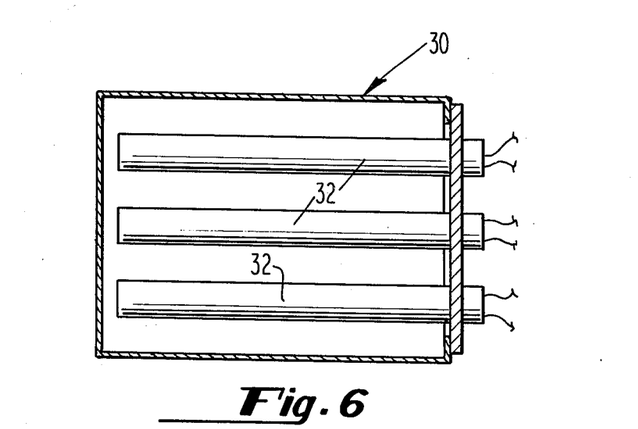
FIG. 6 is an elevational view looking along the line 6—6 of FIG. 3.

FIG. 5 shows the lower portion of corn reservoir 40. As there shown, reservoir 40 tapers at its lower end, forming a discharge throat 41 which is received within and supported by a stub tube 52 which projects upwardly from the wall of a feed screw conveyor 50 and functions as the inlet to the conveyor. Within the feed conveyor 50 is a helical wire 51 which is driven rotationally and which functions as feed screw. The wire helix 51 is connected to a drive shaft 53 which is connected to pulley 54 of a belt-and-pulley drive comprising belt 55, a second pulley 56, a gear reduction unit 57, and a drive motor 58 which is preferably of the pulsating type.

Figure 3:
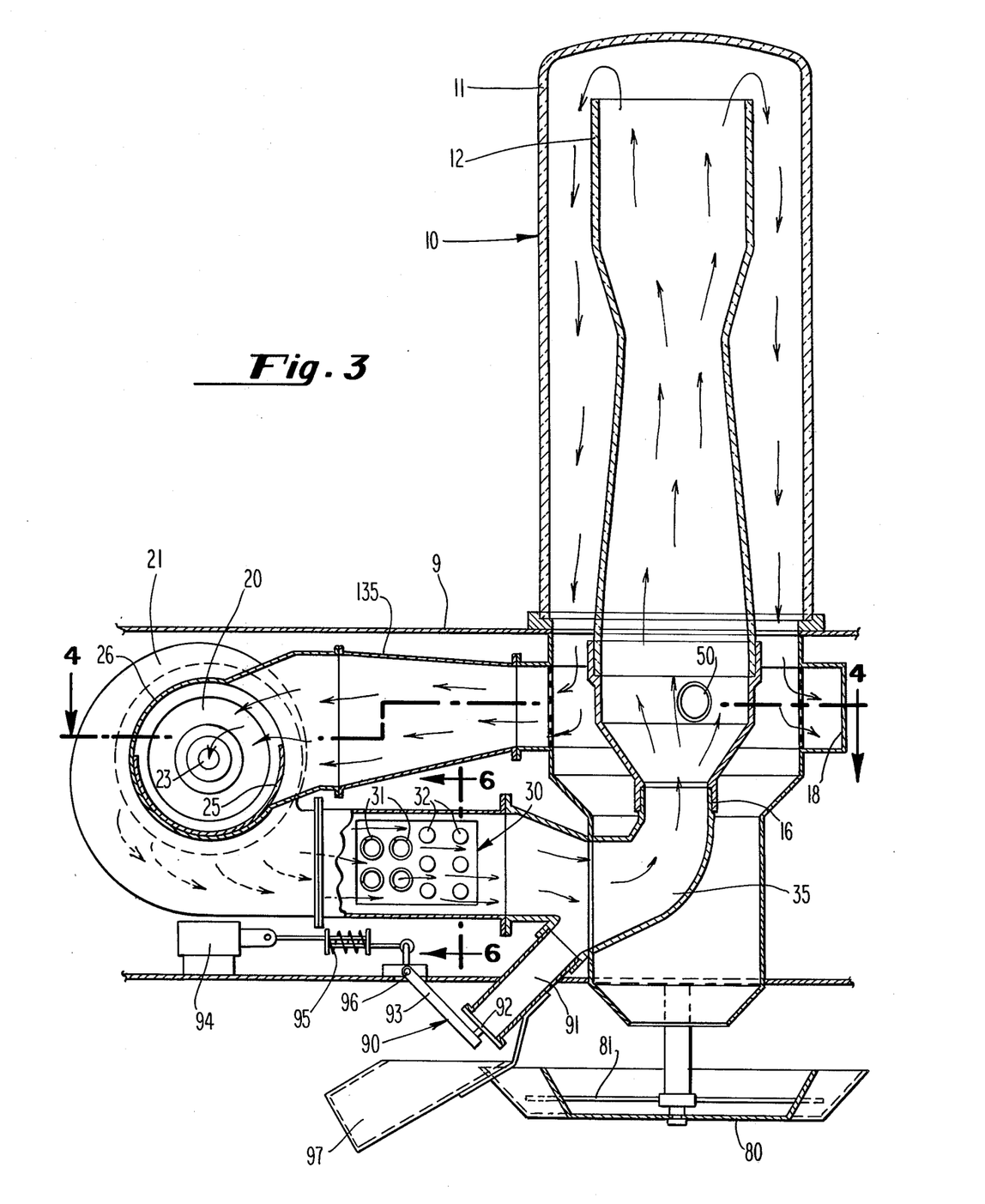
FIG. 3 is an elevational view, in section, looking along the line 3—3 of FIG. 1.
Figure 4:
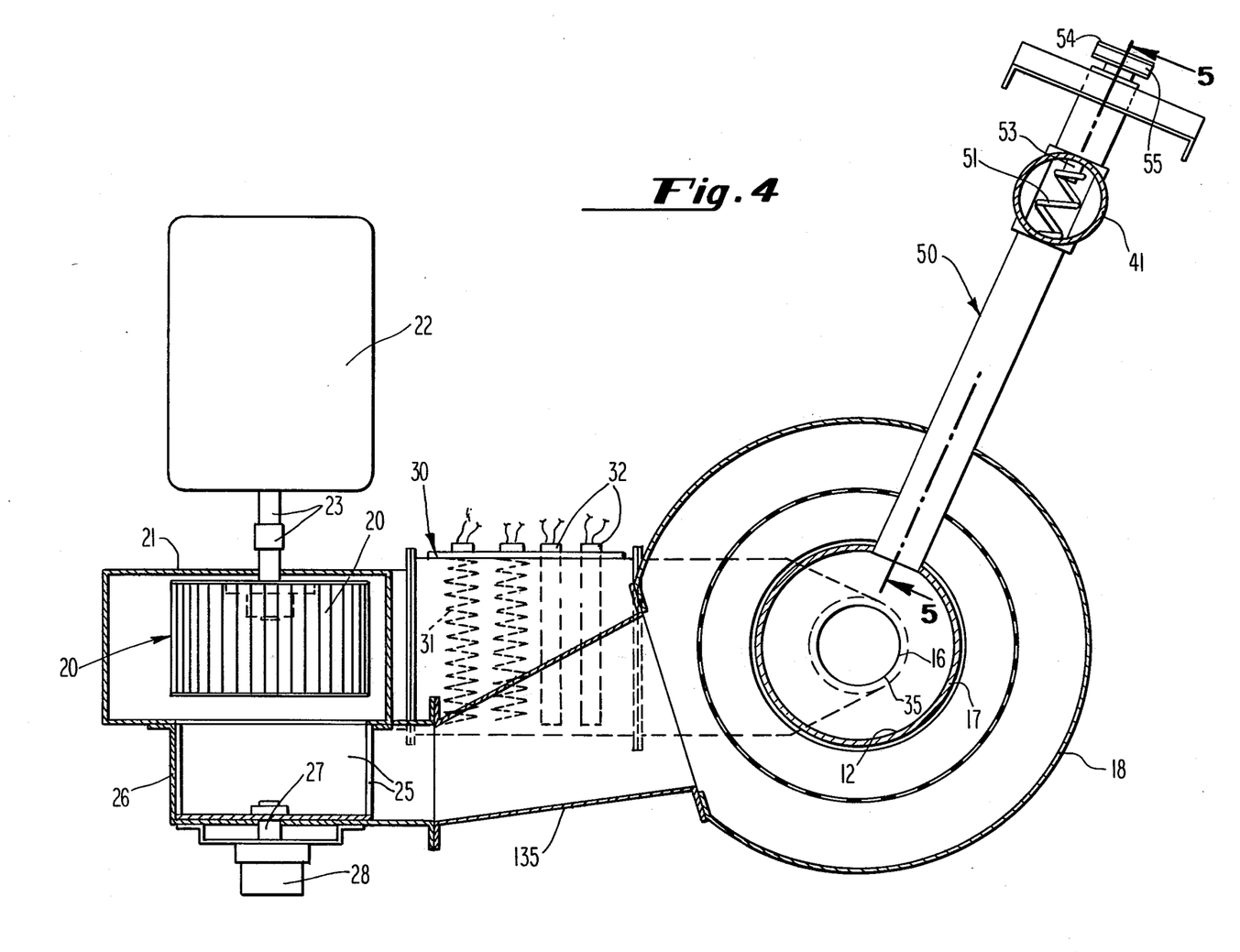
FIG. 4 is a view, in section, looking down along the line 4—4 of FIG. 3.

As shown in FIGS. 3 and 4, a squirrel cage type blower 20, housed within cabinet 21, is driven by a blower motor 22 which is connected to blower 20 by a shaft-and-coupling connection 23. Air from blower 20 is driven through a heater chamber 30 which contains a set of four resistant heaters 31 and a set of six heater rods 32. The hot air which is delivered from heater chamber 30 enters a conduit 35 and is directed upwardly through neck 16 into popping tube 12.

As seen in FIGS. 4 and 5, corn from corn reservoir 40 falls down through outlet neck 41 into the housing of conveyor 50 and is carried by the feed screw 51 to the base of the popping tube 12. As seen in FIG. 3, corn delivered to base of the popping tube 12 is blown upwardly into the tube by the hot air being delivered from blower 20 through heater chamber 30. When the corn in the tube 12 reaches the popping temperature (approximately 390 degrees F.) the corn pops. The popped corn passes outwardly over the upper rim of tube 12 and falls down through the transparent popping jar 11 onto a seasoning tray 80 which is positioned therebelow.

By known means illustrated diagrammatically in FIG. 2 but not shown or described in detail since such mechanism is known, seasoning oil from a supply 60 is delivered through a tube 61 to seasoning tray 80, and salt from a salt supply 70 is delivered to seasoning tray 80. A spider comprising a pair of radial arms 81 is rotated within the tray 80 to stir and mix up the corn so that it is seasoned by the oil and by the salt. The rate of rotation may, for example, be 25–30 r.p.m.

For controlling the temperature of the hot air which is delivered by blower 20 through conduit 35 to the popping tube 12, a damper mechanism is provided (FIGS. 3 and 4) comprising an arcuate plate 25 of semicircular shape mounted on shaft 27 of a damper motor 28. In FIG. 3, the semi-circular plate 25 is illustrated in a position in which the communication between the return conduit 135 and the input to the blower 20 is half-closed half-open. It will be seen that by rotating plate 25 counter-clockwise, the opening may be further closed. As will be described later, the position of plate 25 is adjusted by motor 28 in response to signals received which are under the control of a manually operable selector switch, shown at lines 33–37 of FIG. 7C.

In accordance with the present invention, the feed conveyor 50 (FIG. 4) may be driven at four different basic rates of feed. The rate of feed is controlled by the selector switch and is under the manual control of the operator. When the demand for popcorn is heavy, the operator will set the selector switch to drive the feed conveyor at its maximum rate of feed. When the demand for popcorn is at a minimum, the operator will change the setting to drive the conveyor at its lowest rate. Two intermediate settings are provided for intermediate rates of feed.

In accordance with the present invention, the rate of feed is varied by changing the time segment of a cyclic time period during which the feed conveyor is operated. The rotational speed of the wire-screw conveyor 51 is not changed. In a typical case, the time cycle may be 20 seconds and the feed conveyor may be operative for either 4, or 8, or 12, or 16 seconds in the 20-second period.

As previously mentioned, there are four resistance wire heaters 31 and six rod type heaters 32 housed in heater unit 30. (FIGS. 3-4). The number of heaters which are energized at any one time is controlled by the position of the manually-operated selector switch which controls the rate of feed. Except at start-up, when thereafter the feed conveyor 51 is operated at a minimum feed rate, only three of the six rod heaters are energized. When the operator changes the selector switch to operate the feed conveyor at a higher rate of feed, one or more additional rod heaters are connected into the circuit and energized.

Similarly, the position of the damper plate 25 is changed by the damper motor 28 in response to changes in the setting of the selector switch. When the operator changes the selector switch to operate the feed conveyor at a higher rate of feed, the damper plate 25 is moved in a clockwise direction to increase the size of the opening from return conduit 135 into the blower 20.

FIGS. 7A through 7E is a series of schematic circuit diagrams illustrating the control circuitry and the essential elements thereof. The elements are connected in parallel branch circuits identified as Lines 1 through 78. Each branch circuit is connected between the power lines L1 and L2.

The following is a listing of the most important elements shown in FIGS. 7A-7E:

| Branch Line | Element | Description of Element |
|---|---|---|
| 1 |  | Step-down transformer |
| 2 | TC2 | Start feeder temperature control relay |
| 3 | CH | Control heater relay |
| 4 | CR3 | Over-temperature alarm relay |
| 6 | DCTR | Start-up damper close relay |
| 8 | CR1 | Run relay |
| 9 | TDAS | Automatic stop relay (on delay) |
| 10 | TDRS | Automatic stop reset relay (off delay) |
| 12 | SCR | Manual stop control relay |
| 14 | OMR | Old maid relay |
| 15 | BMR | Blower motor relay |
| 16 | TCR | Temperature control power relay |
| 17 | HC10 | Heating contactor relay |
| 18 | HC15 | Heating contactor relay |
| 20 | HC20 | Heating contactor relay |
| 22 | HC25 | Heating contactor relay |
| 24 | CR2 | Start feed relay |
| 25 | SDTR | Seasoning delay relay |
| 26 | CFTR | Corn feed cycle relay |
| 27-29 |  | Corn feed timer adjustment (ON) |
| 30-31 |  | Corn feed timer adjustment (OFF) |
| 32 | CMFR | Corn feed motor relay |
| 33 | SR | Seasoning relay |
| 34 | CR4 | 4-lb. selection relay |
| 35 | CR8 | 8-lb. selection relay |
| 36 | CR12 | 12-lb. selection relay |
| 37 | CR16 | 16-lb. selection relay |

-continued

| Branch Line | Element | Description of Element |
|---|---|---|
| 38 | TD8 | Delay in 4-lb. feed relay |
| 42 | ADTR8 | Air damper timer (8-lb.) |
| 43 | DCTR8 | Damper close relay (8-4 lb.) |
| 44 | DT12 | Delay in 8-lb. feed |
| 47 | ADTR12 | Air damper timer relay (12 lb.) |
| 48 | DCTR12 | Damper close relay (12-8 lbs.) |
| 49 | TD16 | Delay in 12-lb. feed |
| 51 | ADTR16 | Air damper timer (16 lb.) |
| 52 | DCTR16 | Damper close relay (16-12 lb.) |
| 53 | DMRO | Damper motor relay (open) |
| 56 | DMRC | Damper motor relay (close) |
| 60 | TDSF | Stop feed delay relay |
| 62 | TDSS | Seasoning stop delay relay |
| 63 | TDSH | Heater stop delay relay |
| 64 | TDSB | Blower stop delay relay |
| 65 | TDDC | Damper closing delay relay |
| 66 | BM | Blower Motor relay |
| 67 | 1000W | Heating load |
| 68 | 1000W | Heating load |
| 69 | 500W | Heating load |
| 70 | 500W | Heating load |
| 71 | 500W | Heating load |
| 72 | CFM | Corn feed motor relay |
| 73 | SC-S | Season control relay (salt) |
| 74 | DM | Damper motor relay (open) |
| 75 | DM | Damper motor relay (close) |
| 76 | SR | Seasoning solenoid (oil) |
| 77 | OMR | Old maid solenoid |
| 78 | TC | Temperature controller power relay |

OPERATION

Operation of the corn popping machine is controlled by a printed circuit board with solid state devices. In FIGS. 7A through 7E, a circuitry of the more conventional type is illustrated which is essentially the equivalent of the printed circuit board with solid state devices.

The machine is designed to operate in cycles. A full cycle requires 20 seconds. If corn were fed through the screw conveyor for the full 20-second period, 20-lb. of corn per hour would be produced.

The machine is designed to operate in four popping ranges. In the lowest range, corn is fed by the screw conveyor for 4 seconds in each 20-second cyclic period, and 3 to 5 lbs. of popcorn is produced per hour. This is referred to as the 4-lb range.

In the next higher popping range, corn is fed by the screw conveyor for 8 seconds in each 20-second period, and 7 to 9 lbs. of popped corn is produced per hour. This range is referred to as the 8-lb. range.

In the third range, corn is fed for 12 seconds in each 20-second period, and 11 to 13 lbs. of popped corn is produced per hour. This is referred to as the 12-lb range.

In the fourth or highest range, corn is fed for 16 seconds in each 20-second period, and 15-17 lb. of popped corn is produced per hour. This is referred to as the 16-lb range.

Figure 7A:
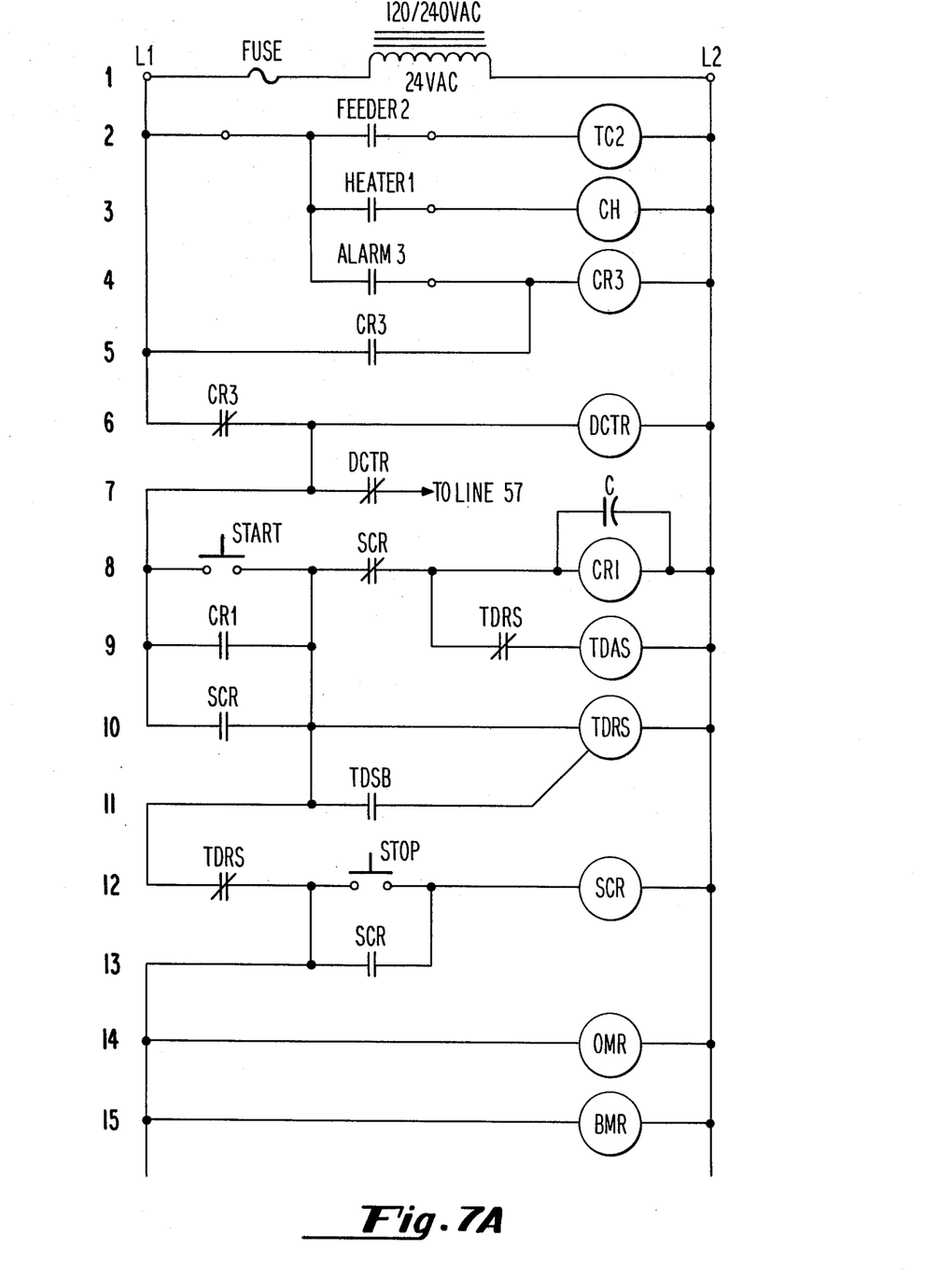
FIGS. 7A through 7E are circuit diagrams of the control circuitry.
Figure 7B:
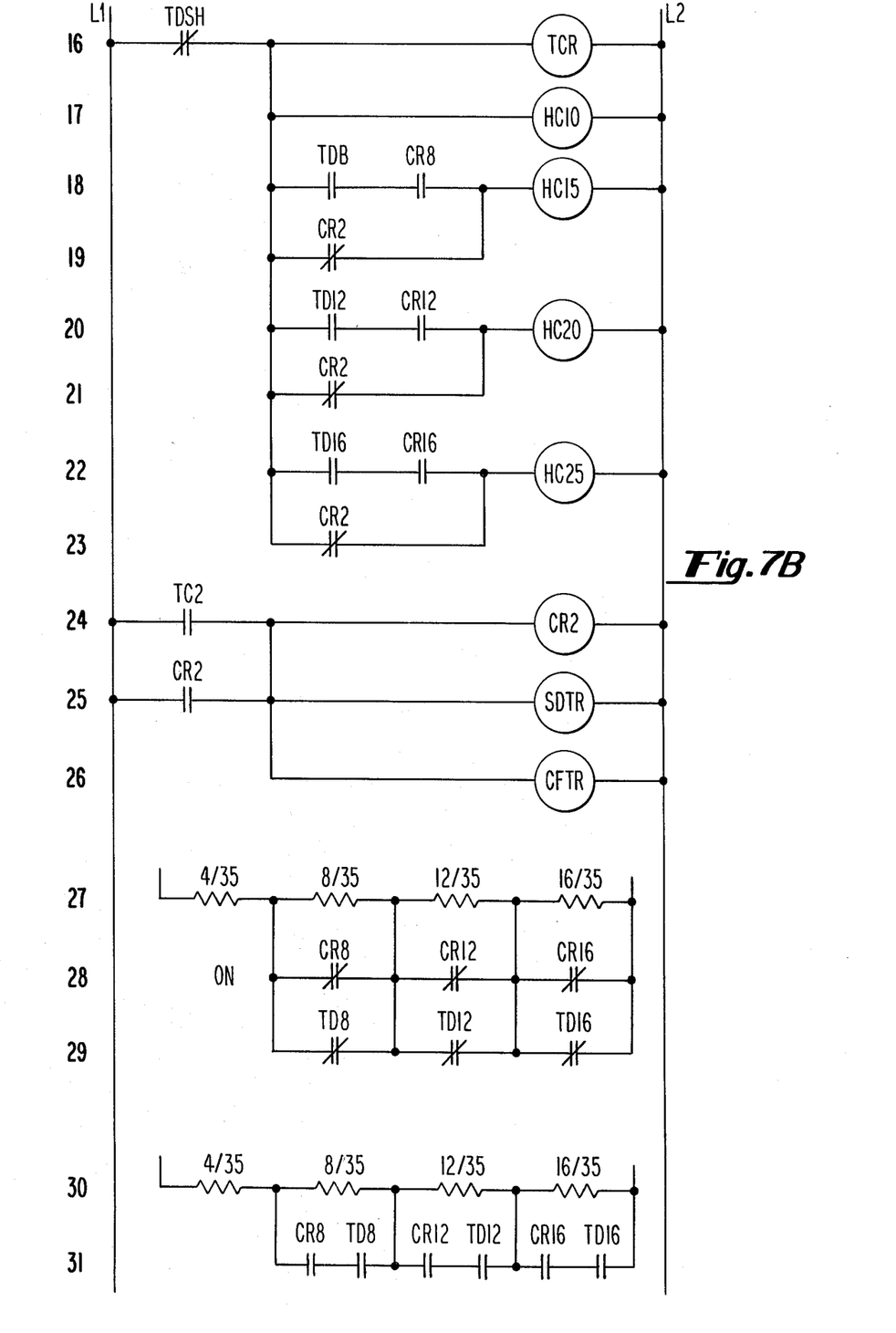
Figure 7C:
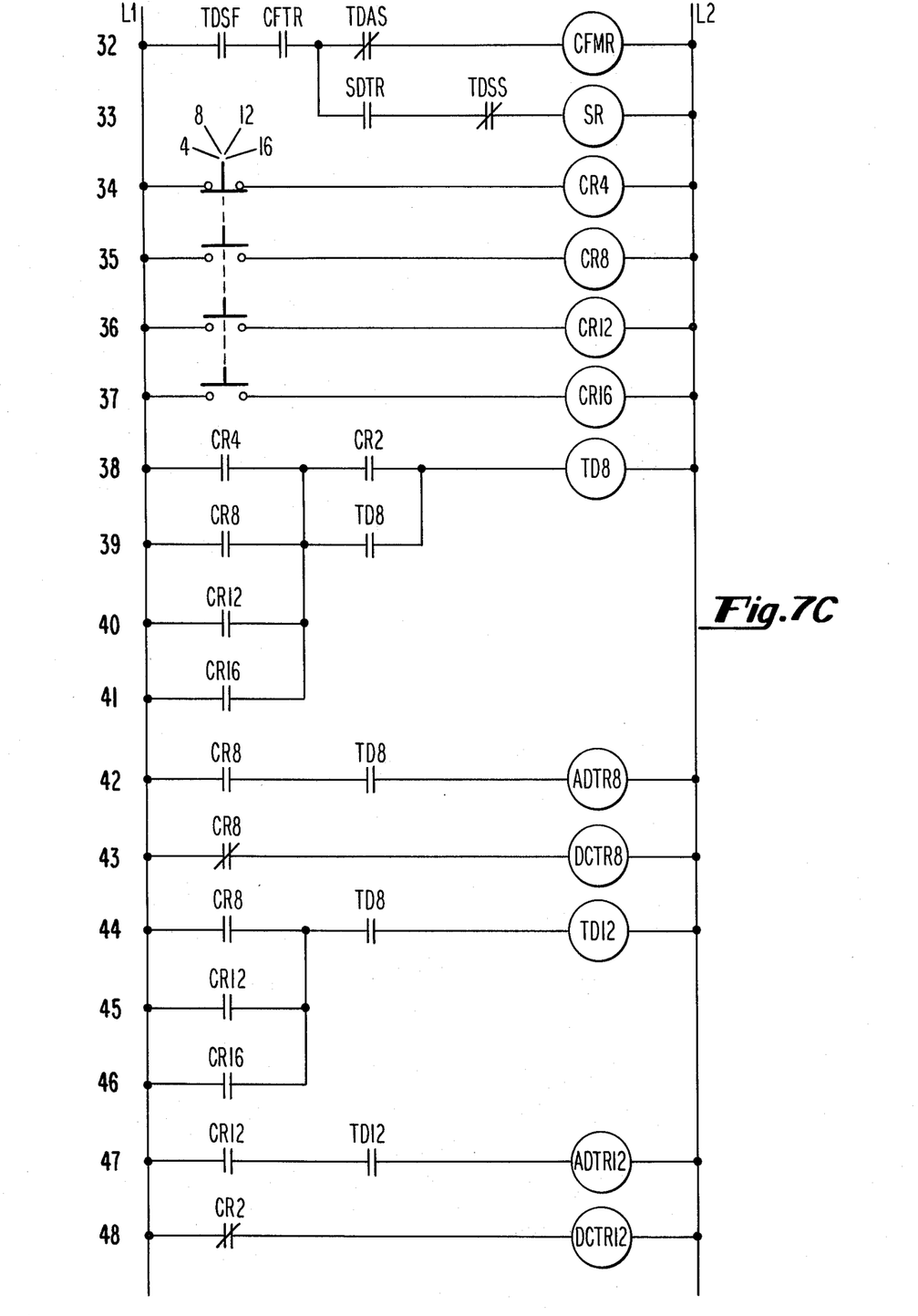
Figure 7D:
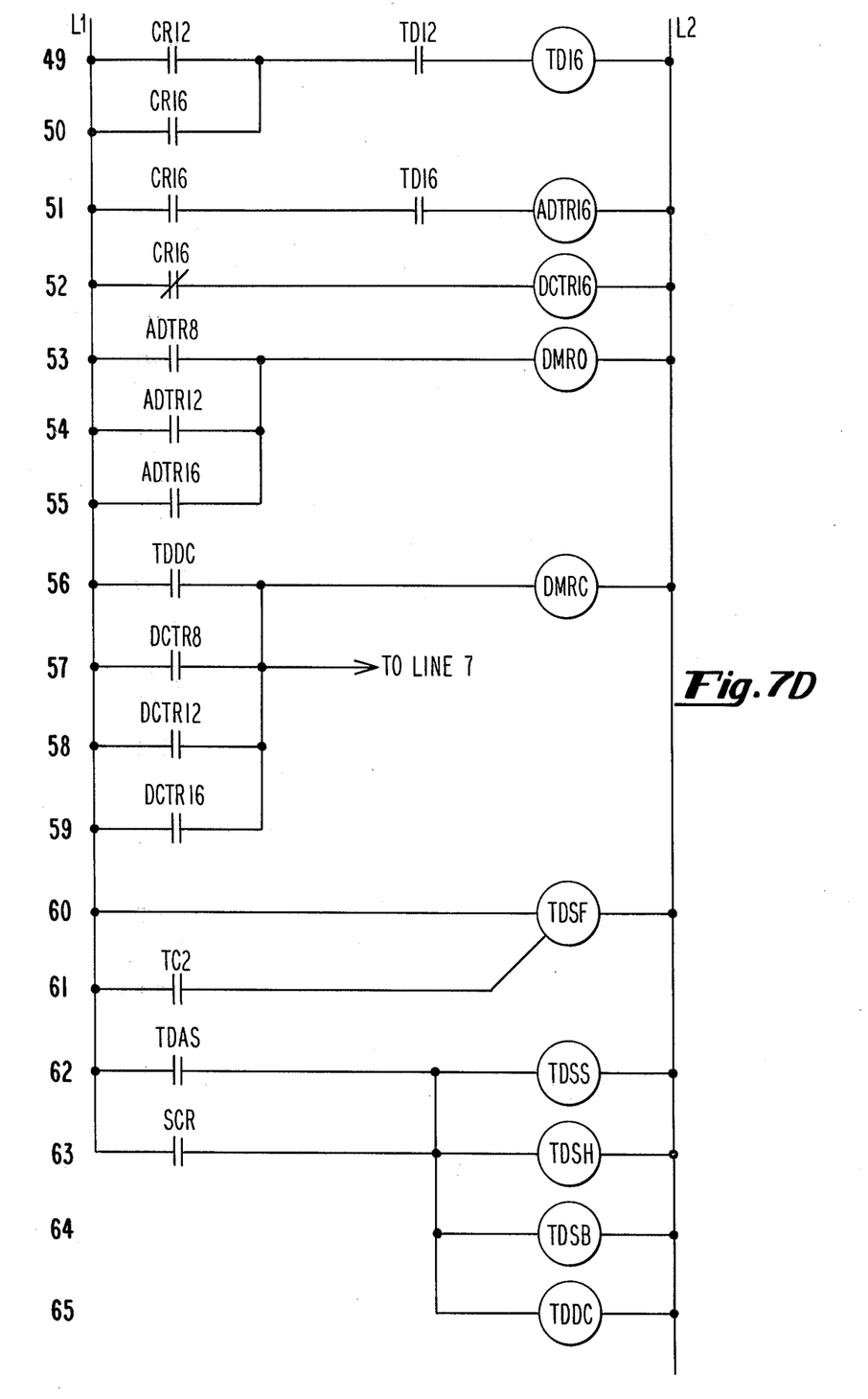
Figure 7E:
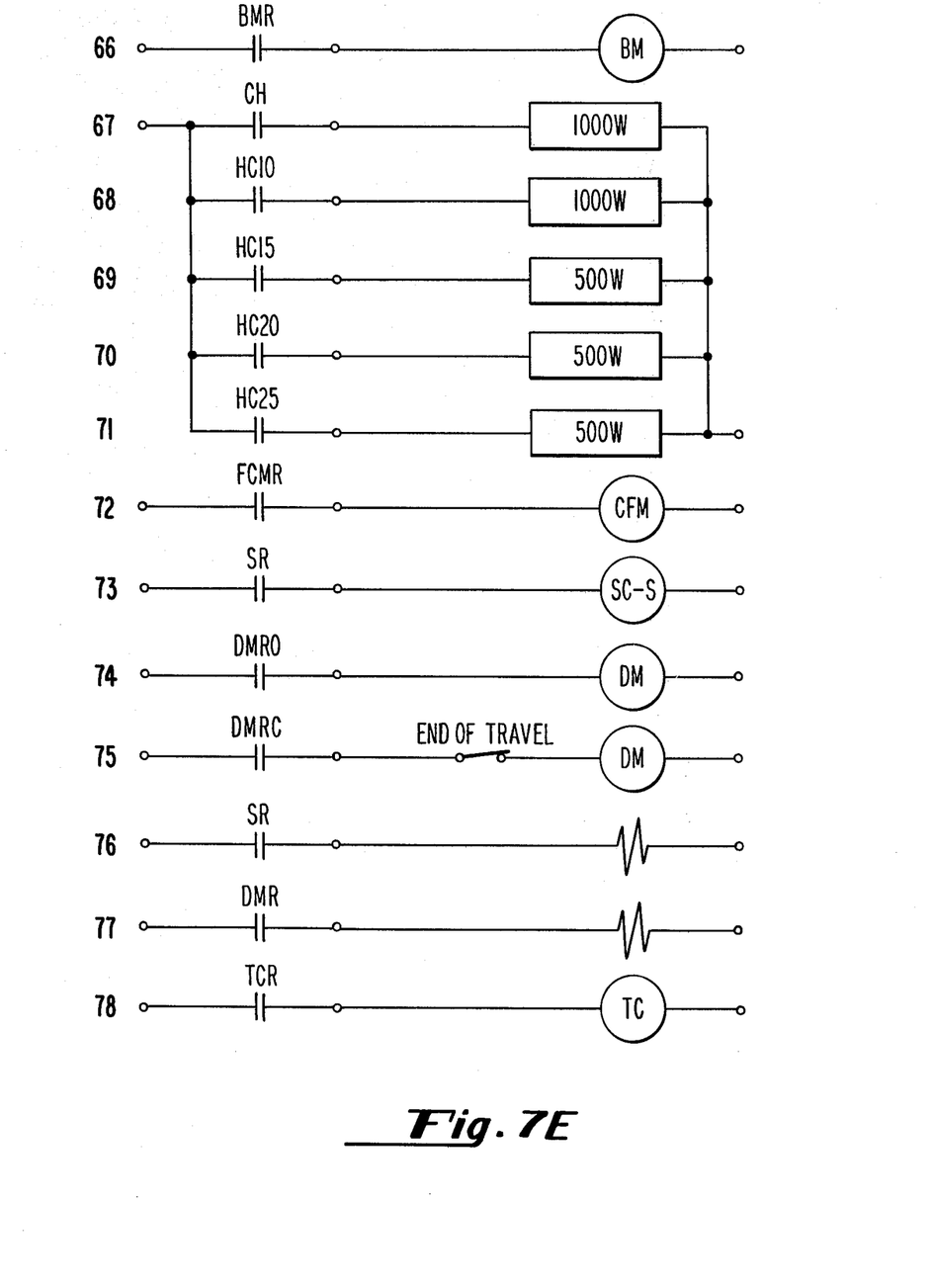

When the machine is actuated, regardless of setting of the range code switch, all heaters in the heater chamber 30 are energized and remain so until the temperature reaches 380° F. under the control of the temperature control power relay TCR is branch line 16 of FIG. 7B.

When the temperature reaches 380° F., contacts in branch line 2 close and the start feeder relay TC2 is energized. This closes contacts TC2 in branch line 24 and energizes relay CR-2. This opens contacts CR2 in lines 19,21 and 23, thereby de-energizing the heating contactor relays HC15, HC20 and HC25 in branch lines 18,20 and 22 and de-energizing the heater elements associated therewith.

When start feeder relay TC2 in branch line 2 and start feed relay CR2 in line 24 became energized, contacts CR2 in line 25 closed and the seasoning delay relay SDTR and corn feed cycle relay CFTR becomes energized.

Relay CFTR in branch line 26 is a timer mechanism. The percentage of time that the timer is ON in each 20-cycle period is dependent upon the setting of the selector switch shown at branch line 33 in FIG. 7C. If the selector switch is set at the first position, i.e. at the 4-lb. per hour range, contacts of relays CR8, CR12 and CR16, in branch line 28 remain closed and the corn feed timer is ON for only 4 seconds and OFF for 16 seconds in each 20-second cycle. If the selector switch at branch line 33 is set at the second position, e.e. at the 8-lb. per hour range, relay CR8 in branch line 35 is energized and the normally open contacts of relay CR8 will close and the normally closed contacts of CR8 will open. Thus, the normally closed contacts of CR8 at branch line 28 will open and the corn feed cycle timer will be ON for 8 seconds and OFF for 12 seconds in each 20-second period.

If the selector switch is placed at the third position, i.e. at the 12-lb. per hour range, relay CR12 at line 36 is energized and the normally-open contacts of CR12 will close and the normally-closed contacts will open. Thus, at branch line 28, the normally-closed contacts CR12, as well as the contacts CR8, will open, and the corn feed cycle timer will be ON for 12 seconds and OFF for 8 seconds in each 20-second period.

When the selector switch is placed in the fourth position, i.e. at the 16-lb. range, relay CR16 at line 37 will close and the normally-closed contacts CR16 at line 28 will open. Thus, the corn feed cycle will be ON for 16 seconds and OFF for 4 seconds.

The number of heater elements in the heating chamber 30 which are energized after the initial temperature of 380° F. is reached is dependent upon the position of the selector switch shown at line 33. If the switch is in the first position, i.e. the 4-lb. range, relay CR4 in branch line 34 is energized and contacts CR4 in line 38 close. Since relay CR2 is at this time also energized (the contacts TC2 being closed as previously described), the relay TD8 in branch line 38 is energized and the contacts TD8 at line 18 are energized. However, the contacts CR8 are still open.

If the selector switch (line 33) is turned to the second position, i.e., in the 8-lb. range, the relay CR8 in branch line 35 is energized and contacts CR8 at line 18 close. This energizes the heating contactor for HC15 and, in branch line 69, an additional heating element is energized.

If the selector switch (line 33) is placed in the third position, i.e., in the 12-lb. range, relay CR12 in branch line 36 is energized and the contacts CR12 at line 20 close. Since relay TD12 at line 44 has previously been energized by the closing of contacts TB8 and CR8, the contacts TD12 in line 20 are also closed. Thus, heating contact HC20 is energized. Thus, in branch line 70, an additional heating element is energized.

When the selector switch is placed in the fourth position, i.e., in the 16-lb. range, the relay CR16 in branch line 37 is energized and the normally-open contacts CR16 close. The relay TD16, in branch line 49 has already been energized by the closing of contacts CR12 and TD12. Thus, the heating contactor HC25 is energized and in branch line 71 an additional heating element is energized.

It will be seen that the amount of heat provided to the air which is flowing through the heating chamber 30 is dependent upon the position of the selector switch in branch line 33. When the selector switch is in the fourth position, which is the 16-lb. range, all of the heating elements are energized.

In addition to the resistance heaters 31 and the rod heaters 32 in the heating chamber 30, the corn popping machine has a trim heater (not illustrated) of the open coil type located at the base of the popping tube 12. This trim heater is designed to turn ON at 392° F. and to turn OFF at 397° F. as sensed by temperature sensors in the base of the popping tube. It is contemplated that at approximately 395° F., it will take one minute for the corn to pop.

When the machine is first turned on the damper is 20° open. This position is considered to be "full close" position. After the operating temperature reaches 385° F., if, for example, the selector switch is in the second or 8-lb range position, the relay CR8 in branch line 35 will have been energized and the normally-open contacts of relay CR8 will close. The normally-open contacts of relay CR2 in branch line 38 will have been closed since relay CR2 (branch line 24) and relay CR4 (branch line 34) will have been energized, as previously described. Thus, relay TD8 (branch line 38) will have been energized and, accordingly, when the normally-open contacts of relay CR8 close (branch line 42) the 8-lb damper timer ADTR8 in line 42 is energized and the normally-open contacts of relay ADTR8 in branch line 53 close. This energizes the damper motor open relay DMRO in branch line 53, and, causes the damper motor in branch line 74 to move in an opening direction. The damper motor may, for example, be a 1-RPM gear motor.

When the selector switch is in the second or 8-lb range position, as just described, the control circuitry illustrated in FIGS. 7A–7E, in addition to doing that which it does when the selector switch is in the first 4-lb range position, delivers current to the damper control motor for a period of 10 seconds starting 30 seconds after the operating temperature reaches 385° F.

With the selector switch in the 12-lb range position, the electrical circuitry, in addition to doing that which it does when the selector switch is in the 8-lb position, delivers current to the damper control motor for 10 seconds beginning 60 seconds after the operating temperature reaches 385° F.

When the selector switch is in the 16-lb range position, the electrical circuitry, in addition to doing everything that it does when the switch is in the 12-lb position, delivers current to the damper control motor for 10 seconds beginning 90 seconds after the operating temperature reaches 385° F.

The delivery of current to the damper control motor for 10 seconds has the effect of moving the damper door through approximately 50°. Thus, when the selector switch is in the 16-lb position, the damper door has been moved three times through 50°, for a total movement of approximately 150°. Thus, the damper door will have moved from its "fully closed position" in which the damper door is 20° open, to "full open position" in which the damper door is approximately at the 180° position and the communication between the return duct 135 and the blower 20 is fully open.

In FIG. 3, a mechanism identified generally by the reference numeral 90 is provided to dispose a corn which fails to pop. Conduit 35 is provided with a short discharge chute 91 whose end is normally closed by a door 92. Unpopped corn falls down into chute 91 and accummulates there. To empty chute 91, a solenoid 94 is actuated to extend spring-loaded rod 95 and cause lever 93 to pivot counter-clockwise about pivot point 96, thereby opening door 92 and allowing the accummulated unpopped corn to fall down into receptacle 97.

What is claimed is:

1. A corn popping machine adapted for cyclic operation, said machine comprising:
   a. a reservoir for unpopped corn;
   b. a transparent bell jar;
   c. a popping tube within said bell jar;
   d. an air blower;
   e. a heating chamber having a plurality of heating elements;
   f. air-flow conveying means coupling said air blower, heating chamber, popping tube and bell jar;
   g. a feed conveyor for transporting unpopped corn from said reservoir to the base of said popping tube;
   h. a manually operable selector switch adapted to be set at a plurality of set positions;
   i. electric means responsive to the position at which said selector switch is set for operating said feed conveyor for a preselected segment of a cyclic time period and for energizing a selected number of heating elements; and
   j. means responsive to a change in the setting of said selector switch for changing said time segment and for changing the number of heating elements which are energized.

2. A corn popping machine according to claim 1 wherein:
   a. damper means are provided in said air-flow conveying means; and
   b. means are provided which in response to a change in the setting of said selector switch change the position of the damper door.

3. A corn popping machine according to claim 2 wherein said selector switch has four set positions and wherein in response to the setting of said switch, said corn feed conveyor is operable at one of four different segments of a cyclic time period.

4. A corn popping machine according to claim 3 wherein said feed conveyor, in response to the setting of said selector switch, is adapted to feed corn at one of the following four approximate rates: 4 lb. per hour; 8 lb. per hour; 12 lb. per hour; 16 lb. per hour.

5. A corn popping machine according to claim 4 wherein the cyclic period of operation of said machine is 20 seconds, and wherein, in response to the setting of said selector switch, said feed conveyor is operated for either 4 seconds, 8 seconds, 12 seconds, or 16 seconds, in each 20 second cyclic period.

6. A corn popping machine according to claim 2 wherein in response to a change of said selector switch from one position to the next adjacent position, the door of said damper is moved through approximately 50 degrees.

7. A corn popping machine according to claim 6 wherein, when selector switch is at the first position corresponding to the lowest rate of feed, the door of said damper is open approximately 20 degrees, and, wherein, when said selector switch is in the fourth position corresponding to the highest rate of feed, said damper door is fully open.

8. A corn popping machine according to claim 1 wherein in response to a change in position of said selector switch from a lower feed position to a higher feed position, the number of heating elements in said heating chamber which are energized is increased.

9. A corn popping machine according to claim 8 wherein corn is popped in said popping tube even when said selector switch is set at the position of lowest rate of feed.

10. A corn popping machine according to claim 1 wherein said air-flow conveying means comprises a conduit extending from the output of said air blower to the input of said heating chamber, a conduit extending from the output of said heating chamber to the base of said popping tube, and a conduit extending from the base of said bell jar to the input of said air blower, said conduit between said bell jar and the input of said air blower being provided with damper means which is responsive to the setting of said selector switch for controlling the air flow to said blower.

11. A corn popping machine according to claim 10 wherein said damper means is an arcuate plate which is rotatable about its center of curvature in response to change in the setting of said selector switch.

12. A corn popping machine according to claim 11 wherein said damper plate is semi-circular in shape.

13. A corn popping machine according to claim 1 wherein said feed conveyor is a spiral-wire screw conveyor.

* * * * *